United States Patent
Kirby

(10) Patent No.: US 9,781,468 B2
(45) Date of Patent: Oct. 3, 2017

(54) DYNAMIC SCALING OF TOUCHPAD/UI GRID SIZE RELATIONSHIP WITHIN A USER INTERFACE

(71) Applicant: EchoStar Technologies, LLC, Englewood, CO (US)

(72) Inventor: Morgan Kirby, Palmer Lake, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/835,290

(22) Filed: Aug. 25, 2015

(65) Prior Publication Data
US 2017/0064373 A1   Mar. 2, 2017

(51) Int. Cl.
| | | |
|---|---|---|
| H04N 21/431 | (2011.01) | |
| H04N 21/422 | (2011.01) | |
| G06F 3/038 | (2013.01) | |
| H04N 5/44 | (2011.01) | |
| G06F 3/0354 | (2013.01) | |

(52) U.S. Cl.
CPC ........ *H04N 21/4312* (2013.01); *G06F 3/038* (2013.01); *G06F 3/03547* (2013.01); *H04N 5/4403* (2013.01); *H04N 21/42218* (2013.01); *H04N 21/42224* (2013.01); *G06F 2203/04803* (2013.01); *H04N 2005/443* (2013.01); *H04N 2005/4439* (2013.01)

(58) Field of Classification Search
CPC ........ H04N 21/4312; H04N 21/42218; H04N 21/42224; H04N 5/4403; H04N 2005/432; H04N 2005/4439; G06F 3/03547; G06F 3/038; G06F 2203/04803
See application file for complete search history.

(56) References Cited

U.S. PATENT DOCUMENTS

| | | | |
|---|---|---|---|
| 8,830,406 B2 | 9/2014 | Tsurumoto et al. | |
| 8,937,687 B2 | 1/2015 | Coburn et al. | |
| 8,963,847 B2 | 2/2015 | Hunt | |
| 9,100,614 B2 | 8/2015 | Minnick et al. | |
| 9,143,715 B2 | 9/2015 | Riddell et al. | |
| 9,213,482 B2 | 12/2015 | Mai et al. | |

(Continued)

FOREIGN PATENT DOCUMENTS

| | | |
|---|---|---|
| EP | 2 597 548 A2 | 5/2013 |
| WO | 2013/167057 A2 | 11/2013 |

OTHER PUBLICATIONS

International Search Report and Written Opinion for PCT/US2016/044827 mailed Nov. 2, 2016, all pages.

(Continued)

*Primary Examiner* — Benjamin R Bruckart
*Assistant Examiner* — Susan X Li
(74) *Attorney, Agent, or Firm* — Kilpatrick Townsend & Stockton LLP

(57) ABSTRACT

Methods and systems, such as television receivers, are disclosed for receiving data from remote controls for manipulation of graphical user interfaces. Aspects include providing a seamless transition between absolute and relative navigational schemes to allow for users to more efficiently make use of touch and position sensitive remote controls. Further, aspects include dynamically scaling the touch and position sensitive remote controls outputs to match various grid sizes that may be included in the graphical user interface.

20 Claims, 15 Drawing Sheets

(56) References Cited

U.S. PATENT DOCUMENTS

| | | | |
|---|---|---|---|
| 2002/0118131 A1 | 8/2002 | Yates et al. | |
| 2004/0041723 A1 | 3/2004 | Shibamiya et al. | |
| 2006/0119585 A1 | 6/2006 | Skinner | |
| 2008/0024682 A1 | 1/2008 | Chen | |
| 2009/0109183 A1 | 4/2009 | Carvajal et al. | |
| 2010/0037180 A1 | 2/2010 | Elias et al. | |
| 2011/0032191 A1 | 2/2011 | Cooke et al. | |
| 2013/0203495 A1 | 8/2013 | Yeh | |
| 2013/0321712 A1* | 12/2013 | Wu | H04N 5/4403 348/734 |
| 2014/0253444 A1* | 9/2014 | Cheng | G06F 3/04883 345/158 |
| 2014/0320744 A1* | 10/2014 | Fan | H04N 5/4403 348/563 |
| 2015/0185950 A1 | 7/2015 | Watanabe et al. | |
| 2015/0312617 A1 | 10/2015 | Chen et al. | |

OTHER PUBLICATIONS

International Search Report and Written Opinion for PCT/US2016/044817 mailed Nov. 2, 2016, all pages.
U.S. Appl. No. 14/835,247, filed Aug. 25, 2015, Preinterview first office action dated Jul. 5, 2016, all pages.

\* cited by examiner

DYNAMIC SCALING OF TOUCHPAD/UI GRID SIZE RELATIONSHIP WITHIN A USER INTERFACE

CROSS-REFERENCE TO RELATED APPLICATION

Not Applicable.

SUMMARY

Described herein are devices, methods, systems and computer program products, for example, useful for manipulating a television receiver and a television display, such as by receiving and interpreting input commands from a remote control including a touch sensitive or position sensitive interface, such as a touch pad or track pad. The disclosed devices, methods, systems and computer program products enable users to initially navigate a graphical user interface using a remote control in an absolute scheme, where coordinates of the touch or position sensitive interface are mapped directly onto the graphical user interface, but then the navigation switches to a relative scheme, where differences in coordinates of the touch or position sensitive interface are mapped onto the graphical user interface. In this way, users can more intuitively navigate the user interface with fewer numbers of remote control interactions. The disclosed devices, methods, systems and computer program products further allow users to navigate any shaped grid of a graphical user interface using a touch or position sensitive interface of a remote control by mapping coordinates of the touch or position sensitive interface in a dynamically fashion, scaling the coordinates to whatever grid may be presented to the user in real-time.

In a first aspect, provided are methods, such as computer implemented methods. Computer implemented methods of this aspect may be performed by television receivers, such as an cable, satellite, or over the top (OTT) receiver. In a specific embodiment, a method of this aspect comprises generating, using a television receiver including one or more processors, a video signal for displaying a receiver interface; receiving a data stream from a remote control associated with the television receiver, such as a data stream that includes coordinates comprising at least a starting coordinate and an ending coordinate including coordinates that correspond to determinations of locations of a position sensitive interface of the remote control; identifying an absolute location of the receiver interface, such as by mapping the starting coordinate of the data stream to the absolute location of the receiver interface; modifying the receiver interface to include an indicator at the absolute location on the receiver interface; identifying a path of the receiver interface for movement of the indicator, such as a path that corresponds to a sequence of locations on the receiver interface from the absolute location to a final location, and where identifying the path may include converting the coordinates to a sequence of relative locations of the receiver interface from the absolute location to the final location; modifying the receiver interface to include the indicator at the sequence of relative locations along the path; and receiving a confirmation signal from the remote control, wherein the confirmation signal corresponds to determination of a selection, and wherein the selection corresponds to selection of an indicated item of the receiver interface. Optionally, the indicated item of the receiver interface corresponds to an item of the receiver interface having the final location.

In some embodiments, methods of this aspect further comprise receiving a second data stream from the remote control, such as a second data stream that includes second coordinates comprising at least a second starting coordinate and a second ending coordinate, and that may correspond to determinations of locations of the position sensitive interface of the remote control; identifying a second path of the receiver interface for movement of the indicator, such as a second path that corresponds to a sequence of locations on the receiver interface from the final location to a second final location, and where identifying the second path includes converting the second coordinates to a second sequence of relative coordinates of the receiver interface from the final location to the second final location; and modifying the receiver interface to include the indicator at the second sequence of relative coordinates along the second path. Optionally, the indicated item of the receiver interface corresponds to an item of the receiver interface having the second final location.

In embodiments, methods of this aspect may further comprise receiving a second data stream from the remote control, such as a second data stream that includes second coordinates comprising at least a second starting coordinate and a second ending coordinate, and where the second coordinates optionally correspond to determinations of locations of the position sensitive interface of the remote control; identifying a second absolute location of the receiver interface, such as by mapping the second starting coordinate of the second data stream to the second absolute location of the receiver interface; modifying the receiver interface to include the indicator at the second absolute location on the receiver interface; identifying a second path of the receiver interface for movement of the indicator, such as a second path that corresponds to a sequence of locations on the receiver interface from the second absolute location to a second final location, and where identifying the second path optionally includes converting the second coordinates to a second sequence of relative coordinates of the receiver interface from the second absolute location to the second final location; and modifying the receiver interface to include the indicator at the second sequence of relative coordinates along the second path. Optionally, a method of this aspect further comprises receiving a second confirmation signal from the remote control, such as a second confirmation signal that corresponds to determination of a second selection, such as a selection of an item of the receiver interface having the second final location.

Optionally, identifying an absolute location of the receiver interface includes converting a starting coordinate to a location on the receiver interface based on mapping a range of coordinates to an arrangement of items on the receiver interface. Optionally, receiving a data stream includes receiving wireless data from the remote control using a remote control interface of the television receiver.

In another embodiment, a method of the first aspect comprises generating, for example using a television receiver including one or more processors, a video signal for displaying a receiver interface; modifying the receiver interface to include a first grid arrangement, such as a first grid arrangement that includes a first plurality of grid locations; receiving first data from a remote control associated with the television receiver, such as first data that includes that a first coordinate corresponding to a determination of a first position of a position sensitive interface of the remote control; mapping the first coordinate to a first grid location of the first grid arrangement; modifying the receiver interface to include a second grid arrangement that is different from the first grid arrangement; receiving second data from the remote control, such as second data including a second coordinate that corresponds to a determination of a second position of the position sensitive interface of the remote control; and mapping the second coordinate to a second grid location of the second grid arrangement. Optionally, mapping the first coordinate includes scaling a first coordinate range of the position sensitive interface to match at least a portion of the first grid arrangement. Optionally, mapping the second coordinate includes scaling a second coordinate range of the position sensitive interface to match at least a portion of the second grid arrangement. Optionally, a coordinate includes two sub-coordinates, such as x-y coordinates or any number of coordinates required by a designated coordinate system.

In one embodiment, a method of this aspect further comprises receiving a confirmation signal from the remote control, such as a confirmation signal that corresponds to determination of a selection; and performing an action based on the item of the first grid arrangement. Optionally, the selection corresponds to selection of an item of the first grid arrangement. In one embodiment, a method of this aspect further comprises receiving a confirmation signal from the remote control, such as a confirmation signal that corresponds to determination of a selection and performing an action based on the item of the first grid arrangement. Optionally, the selection corresponds to selection of an item of the second grid arrangement.

Advantageously, the disclosed methods allow for use of any grid arrangements and may permit a user to use a full range of coordinates of a position sensitive interface of a remote control to interact with the grid arrangement. In embodiments, a grid arrangement corresponds to an arrangement of selectable items included on the receiver interface. Optionally, the first grid arrangement and the second grid arrangement include different numbers of grid locations. Optionally, the first grid arrangement and the second grid arrangement include a same number of grid locations, but where the first grid arrangement has a different layout from the second grid arrangement.

In one embodiment, mapping a coordinate includes scaling a full coordinate range of the position sensitive interface to match a full grid arrangement. Optionally, a scaled coordinate range includes a same number of scaled coordinates as a number of grid locations in a grid arrangement. Optionally, a grid arrangement includes a regular grid array. Optionally, a grid arrangement includes a non-regular grid array.

Any of a variety of remote controls are useful with aspects of the invention. For example, in embodiments, a position sensitive interface of a remote control is touch sensitive interface. In embodiments, a position sensitive interface of a remote control is a gesture interface. Optionally, the position sensitive interface of a remote control is a touch pad interface. Optionally, the position sensitive interface of a remote control is a touch screen interface.]]

In other aspects, systems are provided, such as systems for achieving and/or performing the methods described herein, such as television receivers, set top boxes, etc. In exemplary embodiments, a system of this aspect comprises one or more processors and a non-transitory computer readable storage medium communicatively coupled or otherwise positioned in data communication with the one or more processors. Optionally, a system of this aspect further comprises one or more data transceivers coupled with the one or more processors, such as one or more transceivers useful for receiving and/or decoding streaming television or media data. Optionally, a system of this aspect further comprises one or more media output connections, such as one or more audio-video output connections for providing a displayable video signal to a display device, such as a monitor or television. In embodiments, the non-transitory computer readable storage medium includes instructions that, when executed by the one or more hardware processors, cause the one or more hardware processors to perform one or more of the methods described herein.

For example, in a specific embodiment, a system of this aspect comprises one or more processors, and a non-transitory computer readable storage medium coupled with the one or more processors and including instructions that, when executed by the one or more processors, cause the one or more processors to perform operations including various steps of the method embodiments described above.

In other aspects, computer program products are provided, such as computer program products configured to achieve and/or perform methods described herein. In exemplary embodiments, a computer program product of this aspect is a non-transitory computer readable storage medium comprising instructions that, when executed by one or more hardware processors, cause the one or more hardware processors to perform one or more of the methods described herein.

For example, in a specific embodiment, a computer program product of this aspect comprises a non-transitory computer readable storage medium comprising instructions that, when executed by one or more processors, cause the one or more processors to perform operations including various steps of the method embodiments described above.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

DETAILED DESCRIPTION

Figure 1:
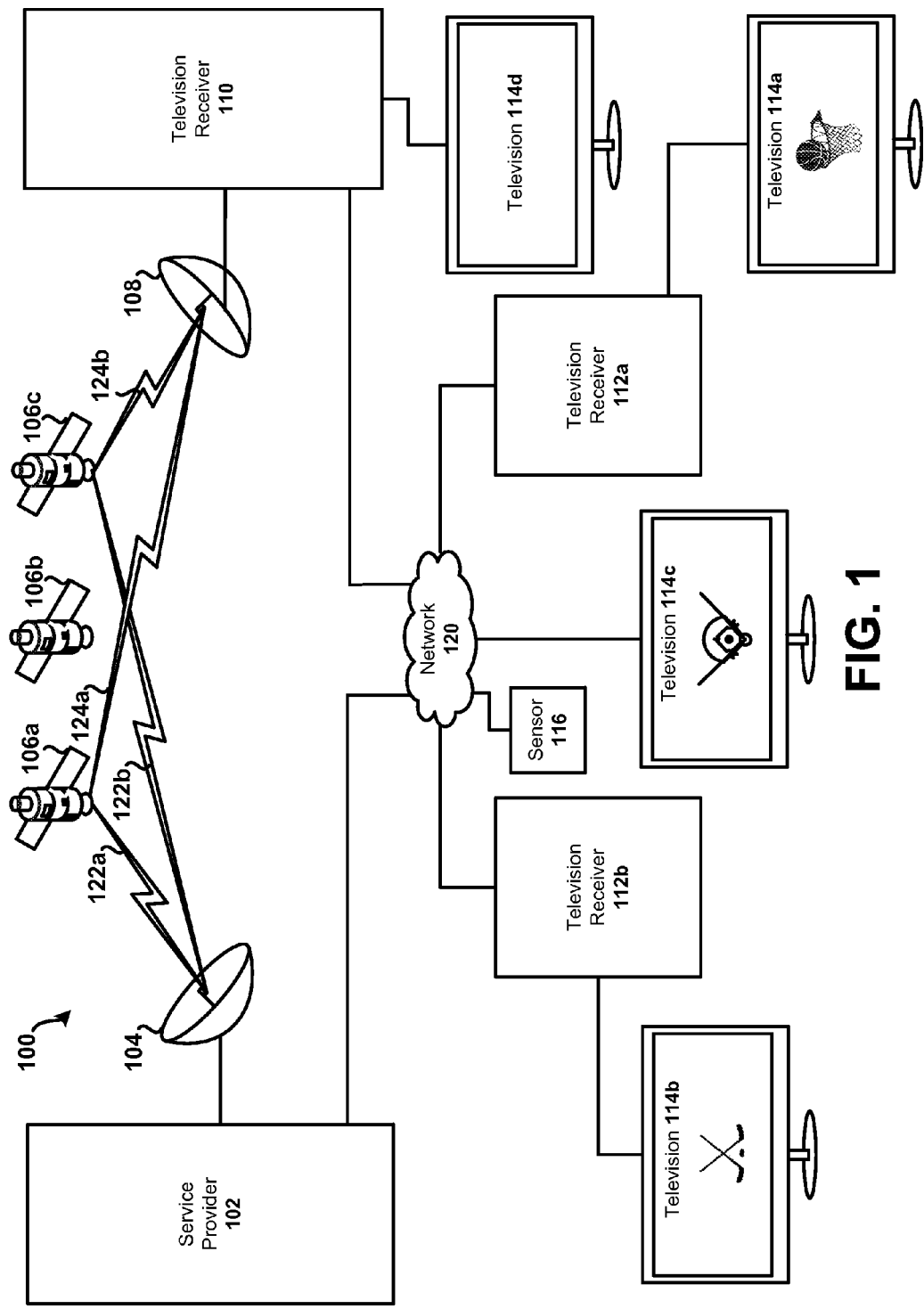
FIG. 1 illustrates an example media content distribution system.

The present disclosure is directed to or towards systems, methods, and products for interacting with and/or controlling a graphical user interface, such as a receiver interface of a television receiver. The disclosed systems, methods, and products enable more efficient navigation of the graphical user interface, such as by interpreting input commands in a more efficient manner, requiring fewer numbers of input steps to achieve a particular result, and/or using reduced processor or system resources, as compared to previous techniques. In this way, a user experience can be enhanced by increasing the usability and reducing the input time required for performing a many step sequence, resulting in a more intuitive input experience for a user.

For example, the disclosed systems, methods, and products may perform navigation of a graphical user interface by receiving input data from a position sensitive and/or touch sensitive input device and processing the input data more efficiently. Position sensitive and touch sensitive input devices are useful for providing input data, such as to a device or system, that can be interpreted as providing motion, position, force, etc. As used herein, position sensitive and touch sensitive input devices are intended to be distinguished from more simple input devices, such as buttons, switches, or arrays of these.

As will be understood by the skilled artisan, buttons or arrays of buttons may be present on a keyboard, remote control, or other similar input device and are typically intended for providing input data via individual buttons presses. A remote control or keyboard may typically include a button array having dimensions of 3 buttons to 40 buttons, for example. In contrast, a touch sensitive and position sensitive input device may encompass orders of magnitude more input elements (e.g., millions) than a keyboard, remote control, or other similar button-based input device, allowing for very fine grained input resolution, and may provide additional information beyond the typical on/off or position input provided by a button, such as force, contact area, speed, direction, etc.

As used herein, a graphical user interface refers to an interactive display in which commands can be entered and received using one or more input devices for purposes of controlling aspects of the graphical user interface, including items or objects shown on the interface. For example, a user may perform item selection using a graphical user interface, such as for advancing a graphical user interface through one or more menus. As another example, a user may input data using a graphical user interface, such as by directing input using a virtual keyboard or keypad. Navigation may be achieved, in various embodiments, by receiving input commands which may select which of a hierarchical group of menus are to be displayed on the graphical user interface. Graphical user interfaces may be displayed to a user on one or more display devices, such as a monitor, television, etc. Graphical user interfaces may be interactive and non-interactive, in part. For example, a graphical user interface may include an input or navigation portion, such as including a grid or arrangement of interactive virtual buttons or selection elements. Additionally or alternatively, portions of a graphical user interface may be used for displaying media content, such as static images or video, which may not be interactive, for example.

Referring now to FIG. 1, an example media content distribution system 100 is shown in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system. Although the depicted system 100 identifies a satellite based content distribution system, the invention may be implemented and/or used with any type of television or video distribution system, such as cable, terrestrial/over the air, IPTV, on demand, subscription-based, network-based, etc. Optionally, the depicted system 100 may be used with a digital video recorder (DVR) system, where content received from a television or video distribution system is recorded for later playback.

The example system 100 may include a service provider 102, a satellite uplink 104, a plurality of orbiting (e.g., geosynchronous) satellites 106a, 106b, 106c, a satellite dish 108, a primary television receiver 110, a plurality of secondary television receivers 112a, 112b, and a plurality of televisions 114a, 114b, 114c, 114d. The system 100 may also include at least one network 120 that establishes a bi-directional communication path for data transfer between and among any of the primary television receiver 110, secondary television receivers 112a-b, televisions 114a-d, and sensor 116 of the example system 100. In some embodiments, sensor 116 may be in data communication with any one or more of the primary television receiver 110, secondary television receivers 112a-b, televisions 114a-d and network 120. Optionally, sensor 116 may be in data communication with service provider 102, such as by way of network 120.

In some embodiments, the network 120 may further establish a bi-directional communication path for data transfer between the primary television receiver 110 and the service provider 102. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 100.

The primary television receiver 110, and the secondary television receivers 112a-b, as described throughout may generally be any type of television receiver, such as a set top box or TV dongle, for example. In another example, the primary television receiver 110, and the secondary television receivers 112a-b, may exhibit functionality integrated as part of or into a television, monitor, a digital video recorder (DVR), a computing device, such as a tablet computing device, or any other computing system or device, as well as variations thereof. Further, the primary television receiver 110 and the network 120, together with the secondary television receivers 112a-b, televisions 114a-d, and optionally one or more sensors 116, may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In practice, the satellites 106a-c may be configured to receive uplink signals 122a, 122b from the satellite uplink 104. In this example, the uplink signals 122a-b may contain one or more transponder streams of particular data or content, such as content streams, like particular television channels or other data feeds, that is supplied by the service provider 102. For example, each of the respective uplink signals 122a-b may contain various media content such a plurality of encoded HD (High Definition) television channels, various SD (Standard Definition) television channels, audio programming, on-demand programming, programming information, advertisements, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, etc.

The satellites 106a-c may further be configured to relay the uplink signals 122a-b to the satellite dish 208 as downlink signals 124a, 124b. Similar to the uplink signals 122a-b, each of the downlink signals 124a-b may contain one or more transponder streams of particular data or content, such as various encoded and/or at least partially electronically scrambled television channels, advertisements, on-demand programming, etc., in accordance with an allotted carrier frequency and bandwidth. The downlink signals 124a-b, however, may not necessarily contain the same or similar content as a corresponding one of the uplink signals 122a-b. For example, the uplink signal 122a may include a first transponder stream containing at least a first group or grouping of television channels, and the downlink signal 124a may include a second transponder stream containing at least a second, different group or grouping of television channels. In other examples, the first and second group of television channels may have one or more television channels in common. In sum, there may be varying degrees of correlation between the uplink signals 122a-b and the downlink signals 124a-b, both in terms of content and underlying characteristics.

Continuing with the example implementation scenario, the satellite dish 108 may be provided for use to receive one or more content streams, for example live, prerecorded or on-demand television programming, such as on a subscription basis, provided by the service provider 102, satellite uplink 104, and/or satellites 106a-c. For example, the satellite dish 108 may be configured to receive particular transponder streams, or downlink signals 124a-b, from one or more of the satellites 106a-c. Based on the characteristics of the primary television receiver 110 and/or satellite dish 108, however, it may only be possible to capture transponder streams from a limited number of transponders concurrently. For example, a tuner of the primary television receiver 110 may only be able to tune to a single transponder stream from a transponder of a single satellite, such as satellite 106a, at a time. In certain embodiments, however, a tuner of primary television receiver 110 may be able to simultaneously receive multiple transponder streams.

Additionally, the primary television receiver 110, which is communicatively coupled to the satellite dish 108, may subsequently select a content stream via a tuner, decode, and relay particular transponder streams to the television 114c or 114d for display thereon. For example, the satellite dish 208 and the primary television receiver 210 may, respectively, be configured to receive, decode, and relay at least one premium high definition (HD) formatted television channel to the television 114c. Programming or content associated with the HD channel may generally be presented "live," or from a recording as previously stored on, by, or at the primary television receiver 110. In this example, the HD channel may be output to the television 114c in accordance with the HDMI/HDCP content protection technologies. Other embodiments are possible. For example, in some embodiments, the HD channel may be output to the television 114c in accordance with the MoCA® (Multimedia over Coax Alliance) home entertainment networking standard. Still other embodiments are possible.

Further, the primary television receiver 110 may select, via one or more tuners, decode, and relay particular transponder streams to one or both of the secondary television receivers 112a-b, which may in turn relay particular transponder streams to a corresponding one of the television 114a and the television 114a for display thereon. For example, the satellite dish 108 and the primary television receiver 110 may, respectively, be configured to receive, decode, and relay at least one television channel to the television 114a by way of the secondary television receiver 112a. Similar to the above-example, the television channel may generally be presented "live," or from a recording as previously stored on the primary television receiver 110, and may be output to the television 114a by way of the secondary television receiver 112a in accordance with a particular content protection technology and/or networking standard. Other embodiments are possible.

In various embodiments, input commands may be received by primary television receiver 110 or secondary television receivers 112a-b, such as for selection of programming for display on televisions 114a-d. Input commands may be received from one or more input devices connected to network 120 or one or more input devices directly or wirelessly connected to primary television receiver 110 or secondary television receivers 112a-b. For example, an input device may exemplified as a remote control.

Figure 2:
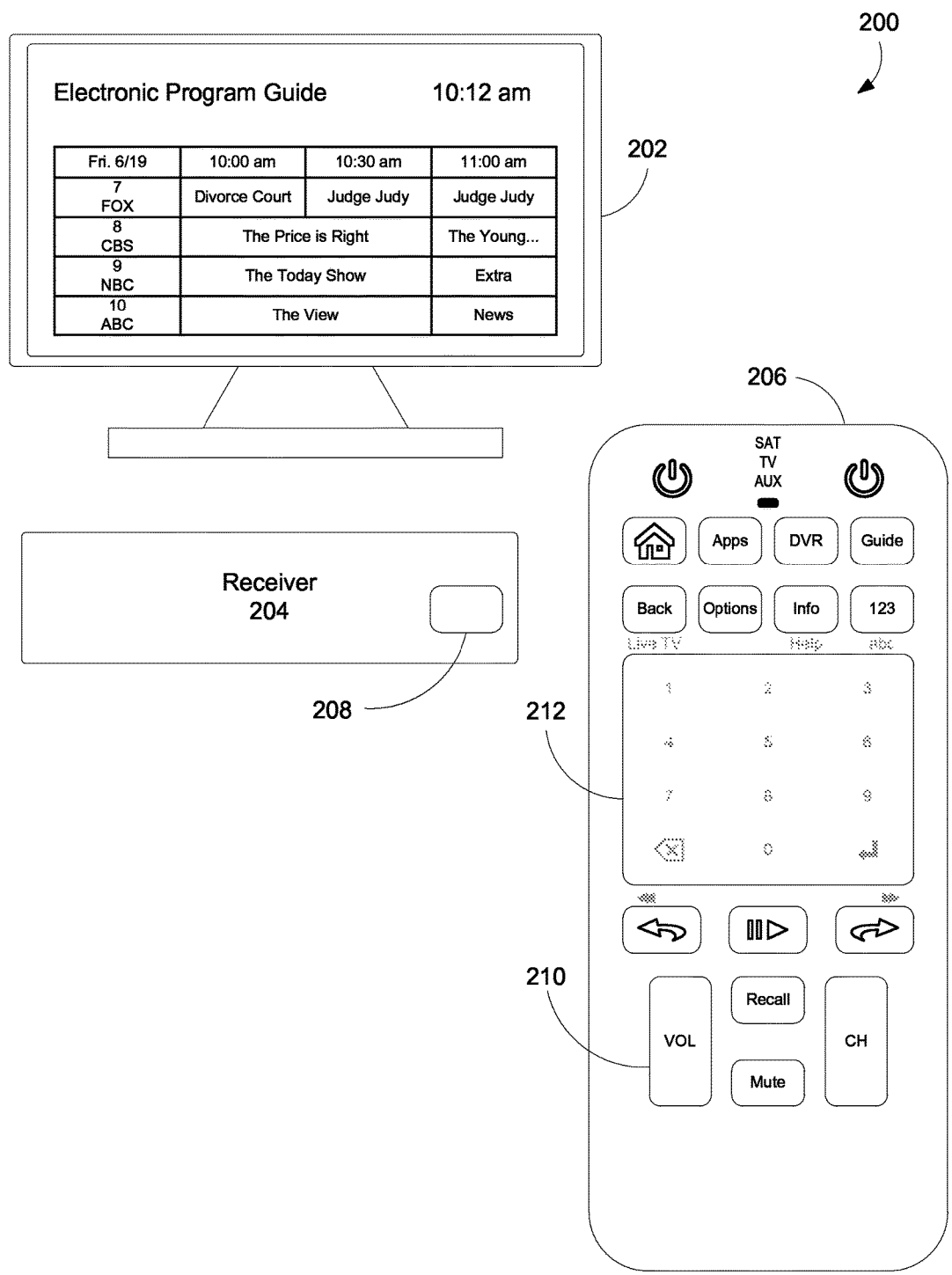
FIG. 2 shows an example television display configuration.

FIG. 2 illustrates an example television display configuration 200, in accordance with some embodiments. Television display configuration 200 includes television 202, receiver 204 and remote control 206. Television 202 may, for example, represent any of televisions 114a-d illustrated in FIG. 1, or another non-television display device, such as a computer monitor. Similarly, receiver 204 may, for example, represent any of primary television receiver 110 or secondary television receivers 112a-b. Television 202 displays a graphical user interface, exemplified as a receiver interface provided by television receiver 204.

As will be understood by the skilled artisan, video signal encoding hardware present within receiver 204 may encode a video signal, such as including the receiver interface and/or television video programming, which is output from the receiver 204. In embodiments, the video signal may be a digital video signal or an analog video signal, which may be provided to television 202, such as using one or more signal cables, such as a composite, S-video, high-definition multimedia interface (HDMI) or other digital or analog signal cable. Embodiments are contemplated where a video signal is provided from receiver 204 to television 202 by way of one or more networks or one or more intermediate devices. Optionally, a video signal may be provided in an uncompressed form or in a compressed form. Upon receiving the video signal, television receiver may decode or otherwise process the video signal for display on the screen of television 202.

Receiver 204 includes remote control interface 208 for receiving commands from remote control 206. Remote control interface 208 may be exemplified by a variety of hardware, such as for wirelessly receiving commands from remote control 206. Wireless remote commands may be received, for example, using one or more wireless technologies, such as optical, infrared or radio frequency electromagnetic technologies. In one embodiment, remote control interface 208 includes an infrared receiver and remote control 206 includes an infrared transmitter. In another embodiment, remote control interface 208 includes a Bluetooth receiver and remote control 206 includes a Bluetooth transmitter. Other examples are possible. Optionally, remote commands from remote control 206 may be received over a wired connection at remote control interface 208.

Remote control 206 is illustrated as including a plurality of buttons 210, as will be understood by the skilled artisan, for communicating any of a set of remote commands to receiver 204 by way of remote control interface 208. Remote control 206 further includes a position sensitive interface 212, here exemplified as a touchpad or trackpad type interface. For user convenience, for example, position sensitive interface 212 may include one or more graphics on the surface, such as numerals or other symbols, as depicted in FIG. 2.

Other remote control types are envisioned, including, but not limited to gesture based devices, such as including one or more gyroscopic sensors, one or more accelerometers, one or more video or optical sensors, one or more depth sensors, one or more range sensors, and/or one or more motion sensors.

Position sensitive interface 212 is useful for generation of coordinates corresponding to locations of the position sensitive interface at which inputs are received. For example, coordinates may be generated by position sensitive interface 212 that correspond to the location on the position sensitive interface 212 at which a user's finger contacts the surface of the position sensitive interface and these coordinates may be transmitted by remote control 206 for receipt at remote control interface 208. As will be understood by the skilled artisan, coordinates of position sensitive interface may correspond to Cartesian coordinates (i.e., x-y position). Alternatively, linear coordinates may be used, which may optionally correspond to an element number of input elements of position sensitive interface 212 (e.g., row 1 includes element numbers 1 to n, row two includes element numbers n+1 to 2n, etc.). Other coordinate systems are possible. Position sensitive interface 212 may also include one or more buttons which may be clickable, as will be understood by the skilled artisan, to allow the position sensitive interface to register button presses, which may be communicated and/or interpreted as selection or confirmation signals, in addition to location coordinates.

FIG. 3A, FIG. 3B, FIG. 3C, and FIG. 3D depicts embodiments showing a receiver interface 302 for entry of data and overhead and front views of a remote control 306. As illustrated, receiver interface 302 shows a virtual keyboard for entry of text into a search box. Characters may be selectable, such as using remote control 306.

Figure 3A:
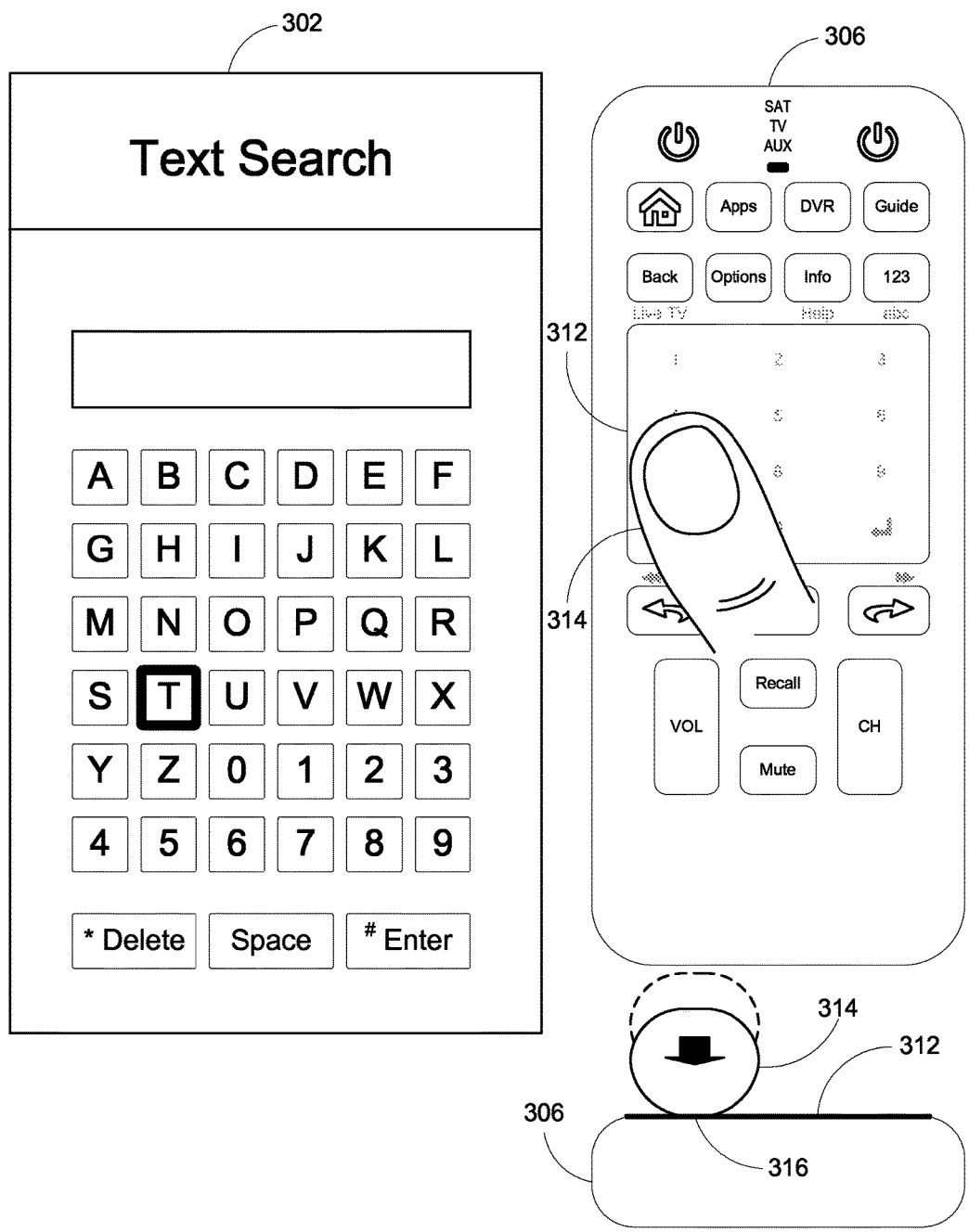
FIG. 3A, FIG. 3B, FIG. 3C, and FIG. 3D show example entry of data in accordance with some embodiments.

As illustrated in FIG. 3A aspects of the invention may be implemented for allowing a user to provide data to a television receiver, resulting in modification of receiver interface 302. In FIG. 3A, when a user's finger 314 first makes contact (316) with the position sensitive interface 312 of remote control 306, coordinates of contact 316 may be generated by remote control 306 and transmitted to a television receiver, for example. The coordinates of contact 316 received by the television receiver may be mapped to an absolute location on receiver interface 302. For example, the coordinates of contact 316 may be mapped to a corresponding absolute location on the receiver interface 302, and the receiver interface 302 may be modified, such as to include an indicator at the absolute location of the receiver interface, here exemplified as a highlighted border around the character "T". In this way, a user may be able to provide an approximate location of their desired input in an absolute fashion, with the touch sensitive interface being mapped onto the receiver interface 302.

Figure 3B:
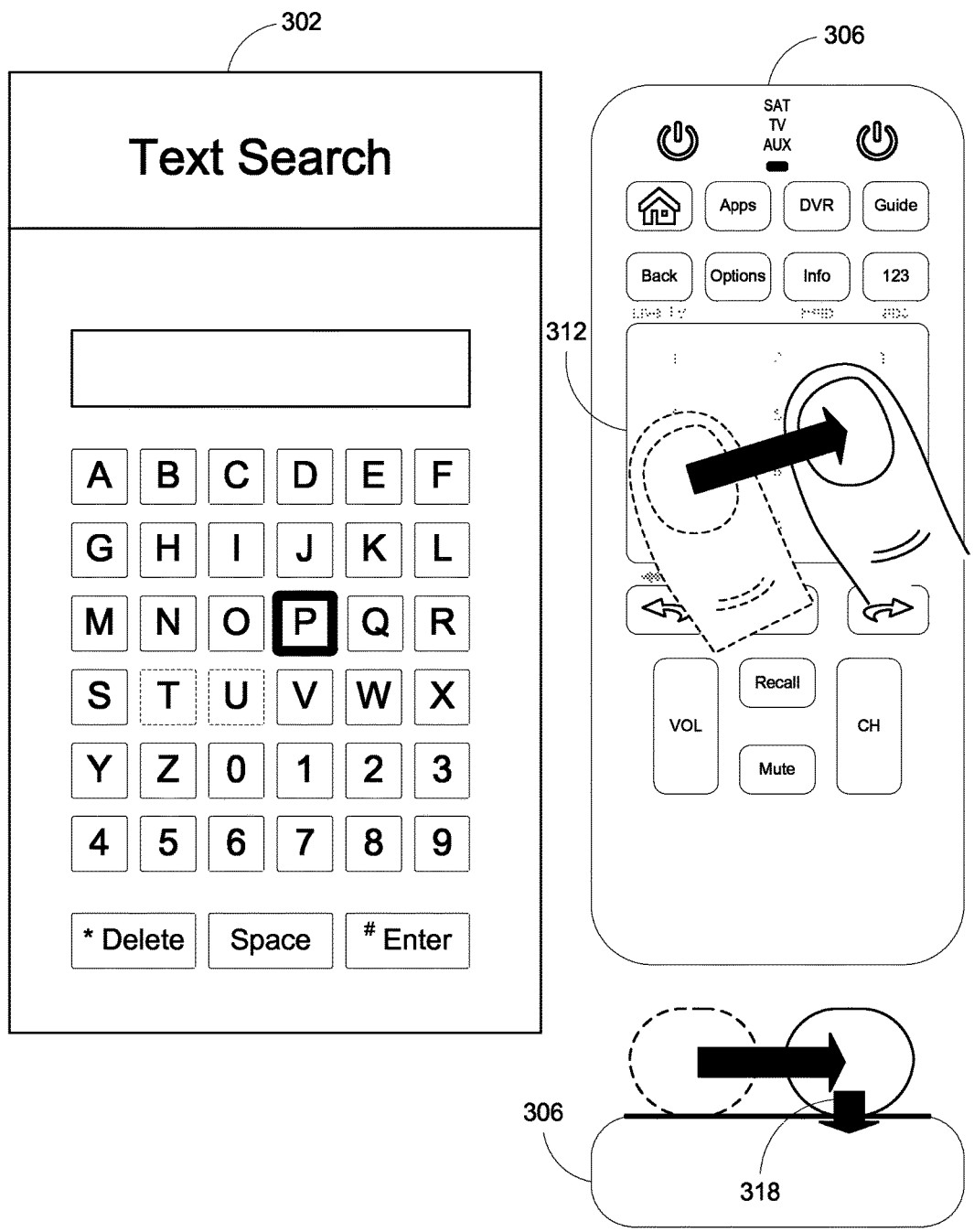

Should a user wish to select a different position on receiver interface 302, relative translation of the indicated position can be provided by a corresponding relative motion of the user's finger 314 on position sensitive interface 312. Motion of the user's finger 314 while it is in contact with position sensitive interface 312 of remote control 306 may result in additional coordinates being generated and transmitted by remote control 306. FIG. 3B illustrates such an embodiment. Coordinates transmitted by the remote control may be received at the television receiver as a stream of data including a plurality of coordinates including a starting coordinate corresponding to contact 316. The stream of coordinates may be mapped to a path on the receiver interface 302 for translation of the indicator in a motion corresponding to the motion of the user's finger on the position sensitive interface 312. In FIG. 3B, the user's finger slides across position sensitive interface from the lower left position, corresponding to the character "T" to a position up and to the right, passing, for example, through first past the character "U" to the character "P".

When a user desires to register a selection indicated by the highlight, further input may be provided, such as a button press. As illustrated in FIG. 3B, when position sensitive interface 312 is exemplified as a clickable touch pad, such a selection may be provided by the user pressing down 318 on the touch pad, so as to "click" and engage a button beneath the touch pad. In response to the button being engaged, remote control 306 may transmit a confirmation or selection signal, which is received by the television receiver and may result in the television receiver modifying the receiver interface 302 in accordance with the selection.

Figure 3C:
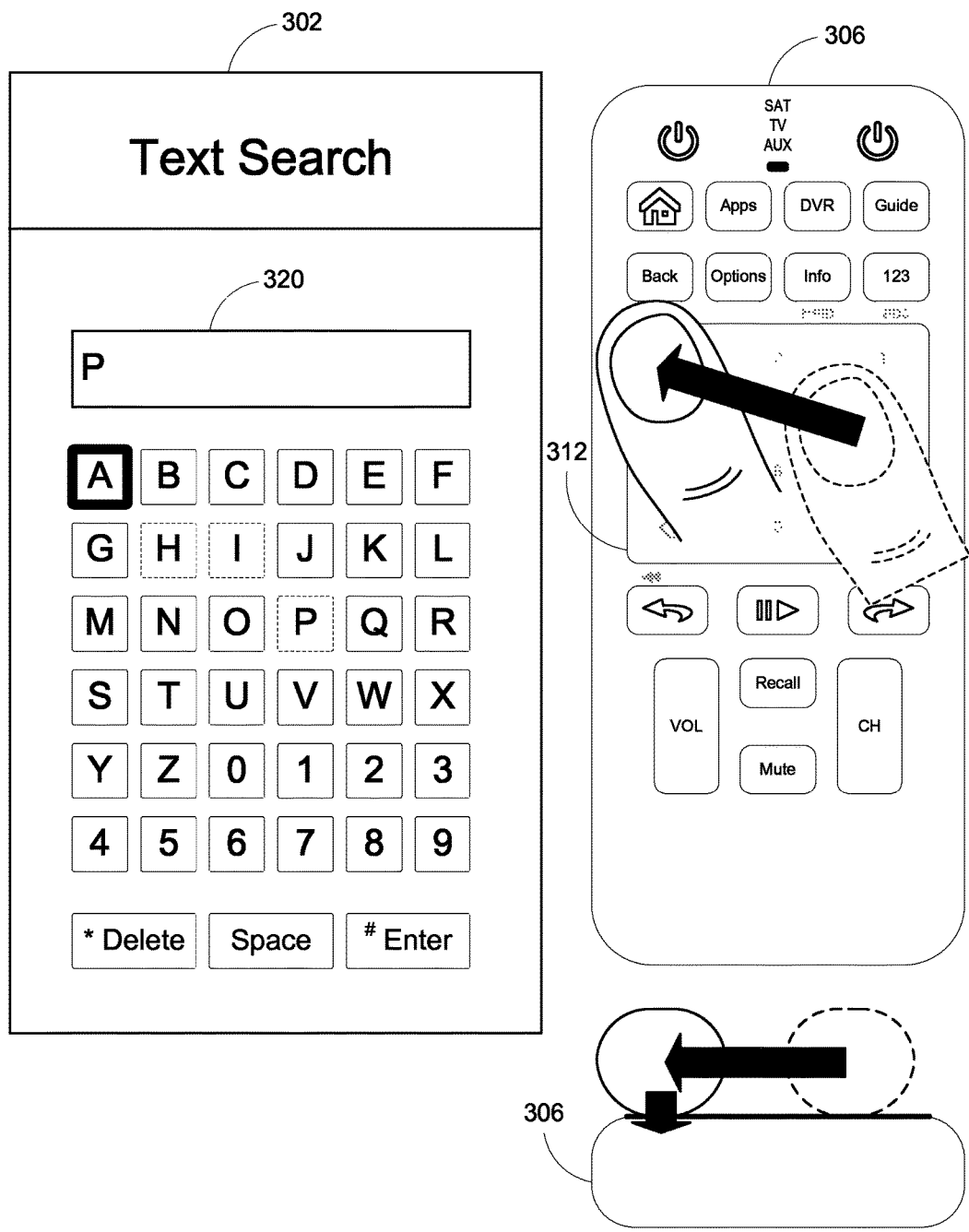

Upon registration of the selection of the character "P", the search form 320 on receiver interface 302 may be populated with the selected character, as illustrated in FIG. 3C. Further additional characters and inputs may be selected. In FIG. 3C, the user's finger travels from the location on position sensitive interface 312 corresponding to the character "P" to the location corresponding to the character "A" to enter this as the next character in the search query. A stream of coordinates may be received at the television receiver from remote control 306 corresponding to the motion, and these coordinates may be mapped into a relative translation of the highlighted character on a path from "P" to "A", passing through and highlighting intermediate characters as appropriate, by sequential modifications of the receiver interface 302. Again, registration of a selection by engaging the button beneath the touch pad results in remote control 306 transmitting a selection signal, which is received by the television receiver and may result in the television receiver modifying the receiver interface 302 in accordance with the selection.

Figure 3D:
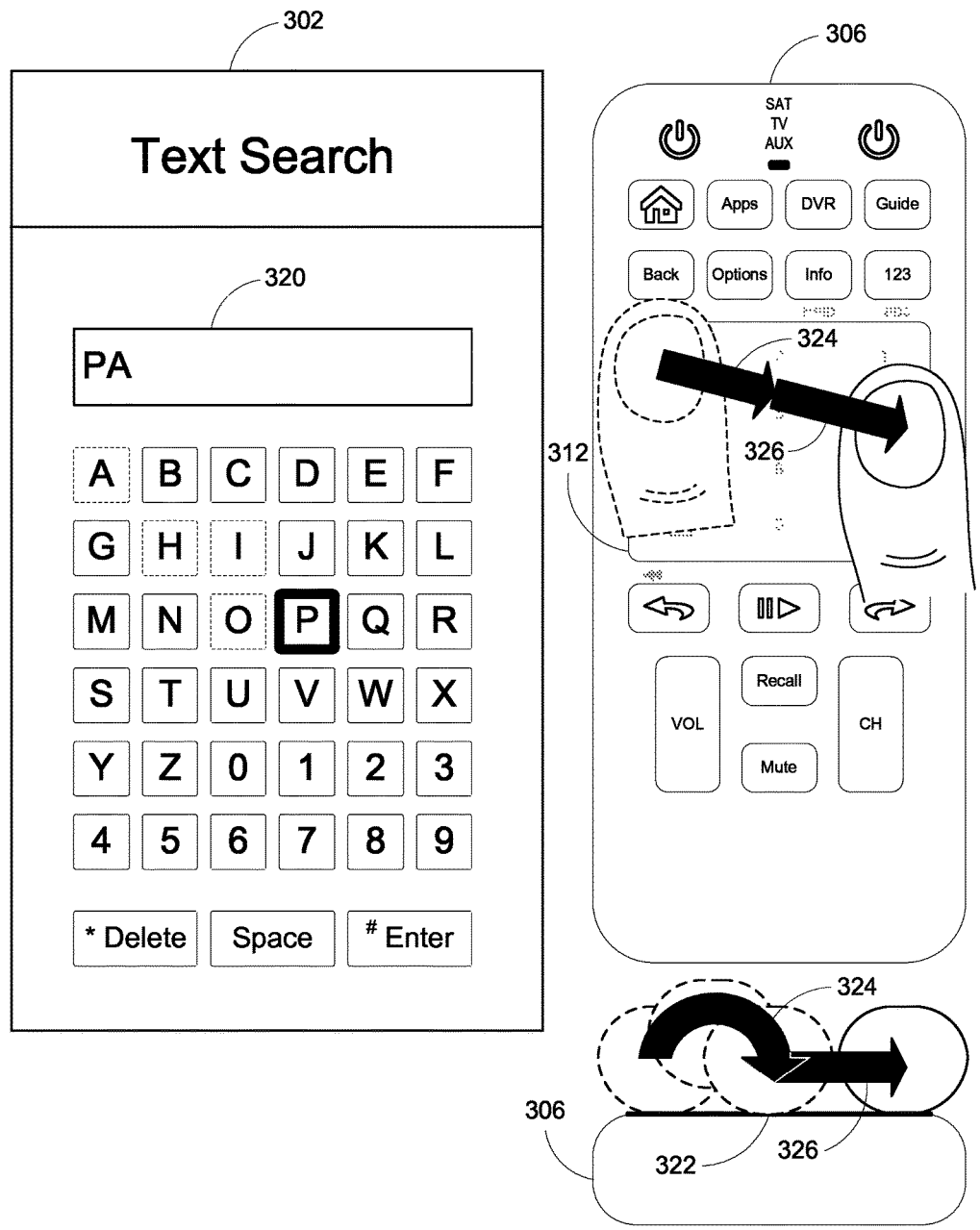

As illustrated in FIG. 3D, the user's finger 314 may be lifted from the touch sensitive interface 312 and moved to and brought into contact with the touch sensitive interface 312 at a different location 322, in a first motion 324. This results in transmission of coordinates corresponding to the different location 322 by remote control 306. At this point, no change in the indicated position is made on receiver interface 302, which remains at the location of the character "A". In a second motion 326, the user's finger 314 is moved across touch sensitive interface 312, and a stream of coordinates are transmitted by remote control 306. Upon receiving the stream of coordinates, these coordinates are mapped in a relative fashion to result in modification of the receiver interface to generate a relative translation of the indicated position, such as first to the character "H", then to the character "I", then to the character "O", then to the character "P". Optionally, the user may register a selection, such as by engaging the button beneath the touch pad may, which may result in generation of a selection signal. Further relative translations and selections may be repeated, as desired.

The techniques described above and illustrated by FIGS. 3A-3D exemplify how the television receiver may receive a stream of data including a plurality of coordinates and interpret a first coordinate in an absolute sense to position an indicator on a receiver interface, with subsequent coordinates interpreted as relative translations of the indicator on the receiver interface.

Figure 4A:
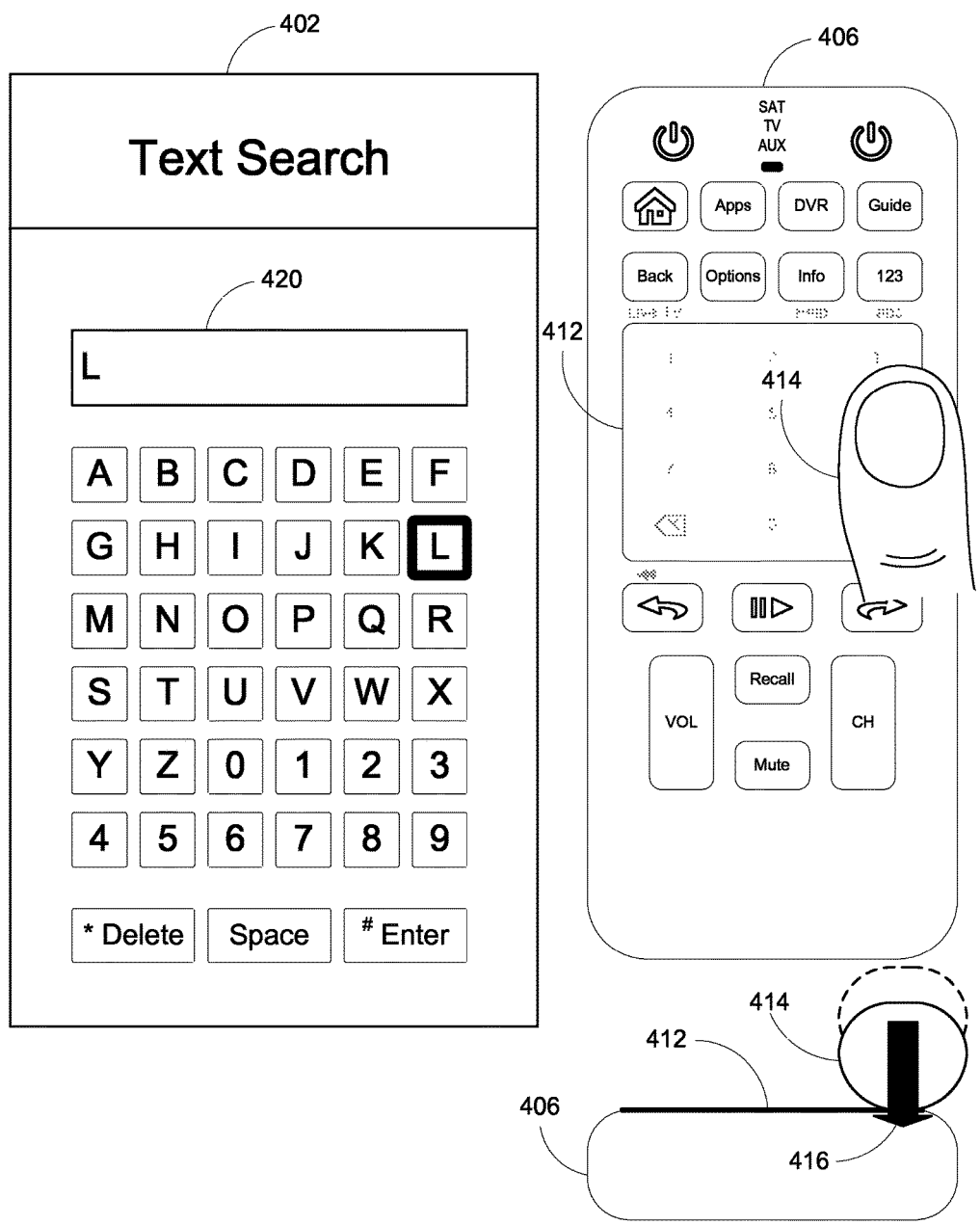
FIG. 4A, FIG. 4B, and FIG. 4C show example entry of data in accordance with some embodiments.
Figure 4B:
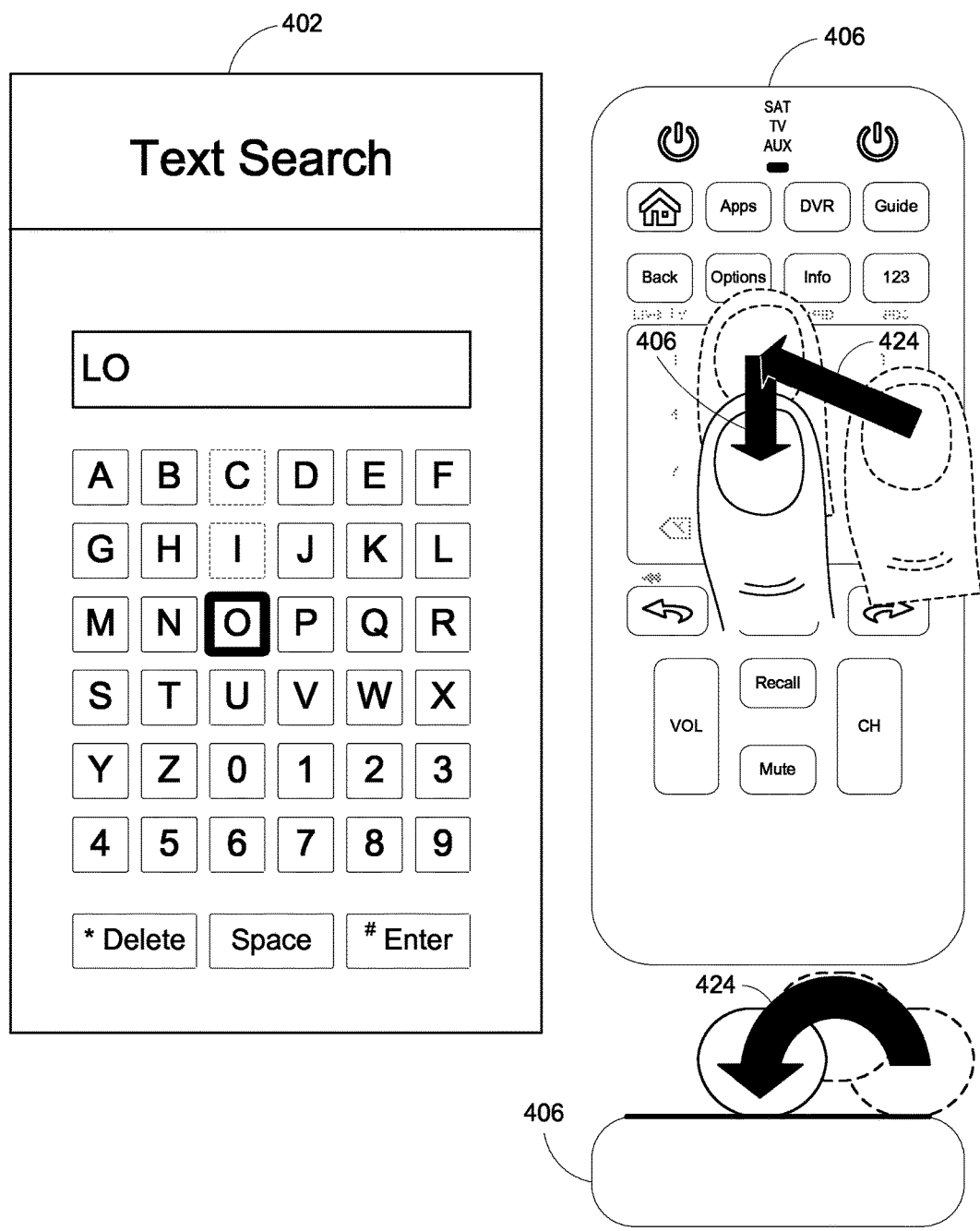

Another embodiment is illustrated in FIG. 4A, FIG. 4B, and FIG. 4D, which depicts a receiver interface 402 for entry of data and overhead and front views of a remote control 406. Here, user's finger 414 is simultaneously or substantially simultaneously brought into contact with position sensitive interface 412 and a selection is made, as indicated by element 416, such as by engaging a button underneath the position sensitive interface 412. In this way, coordinates of the location at which user's finger 414 is brought into contact with the position sensitive interface can be transmitted to the television receiver, which can modify the receiver interface to indicate the corresponding absolute location of the character grid (highlighted character "L"), and an entry in search form 420 generated via a modification to the receiver interface.

In the instance illustrated in FIG. 4B, the user's finger is lifted from the touch sensitive interface, as illustrated by motion 424, and brought back into contact with the touch sensitive interface at a location corresponding to the character "C" on the character grid. Coordinates of this location are transmitted by the remote control 406 to a television receiver. In this embodiment, because the previous character "L" was registered via a selection signal, this resulted in a reset of the absolute/relative translation scheme and the re-positioning of the user's finger 414 on position sensitive interface 412 results in the coordinates transmitted by remote control 406 being mapped in an absolute sense to the character grid, so the character "C" becomes the indicated character upon the receiver interface 402 being changed in response to the coordinates received. When the user's finger is dragged across the position sensitive interface 412, as shown by motion 426, a stream of coordinates are transmitted by remote control 406. The stream of received coordinates are mapped in a relative sense by the television receiver, and corresponding changes to receiver interface 402 are made, with the "I" character becoming indicated by a highlight, followed by the "O" character becoming subsequently indicated. Registration of a selection, such as by engaging the button beneath the position sensitive interface 412, may result in the television receiver receiving a selection signal and interpreting this signal for registration of the indicated character "O", with a corresponding change made to the receiver interface 402.

Figure 4C:
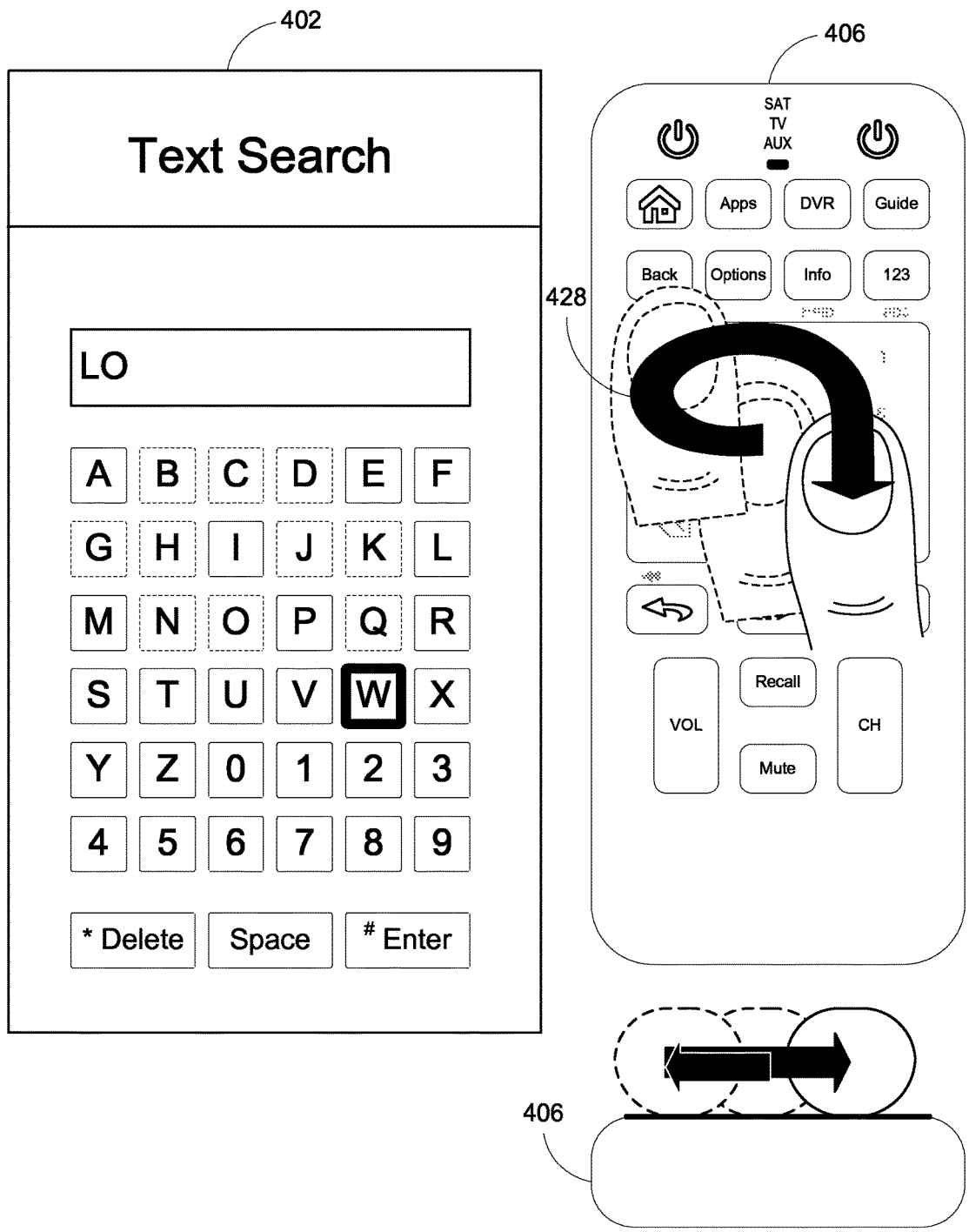

In FIG. 4C, the user's finger is not lifted from the position sensitive interface 412, but instead moves around the position sensitive interface according to path 428. Although a selection signal was registered previous to this motion, since the user's finger was not removed from the position sensitive interface, the stream of coordinates corresponding to path 428 include a first coordinate that is mapped in an absolute sense to the position on the character grid corresponding to the character "O". Following this, additional coordinates of the stream are received by the television receiver and mapped to follow a relative path, for example a path that moves as follows: "N" to "H" to "G" to "B" to "C" to "D" to "J" to "K" to "Q" to "W".

The techniques described above and illustrated by FIGS. 4A-4C exemplify how the television receiver may receive a stream of data including a plurality of coordinates and interpret a first coordinate in an absolute sense to position an indicator on a receiver interface, with subsequent coordinates interpreted as relative translations of the indicator on the receiver interface and additionally reset for interpretation of a next coordinate in the absolute sense following a selection signal.

Figure 5:
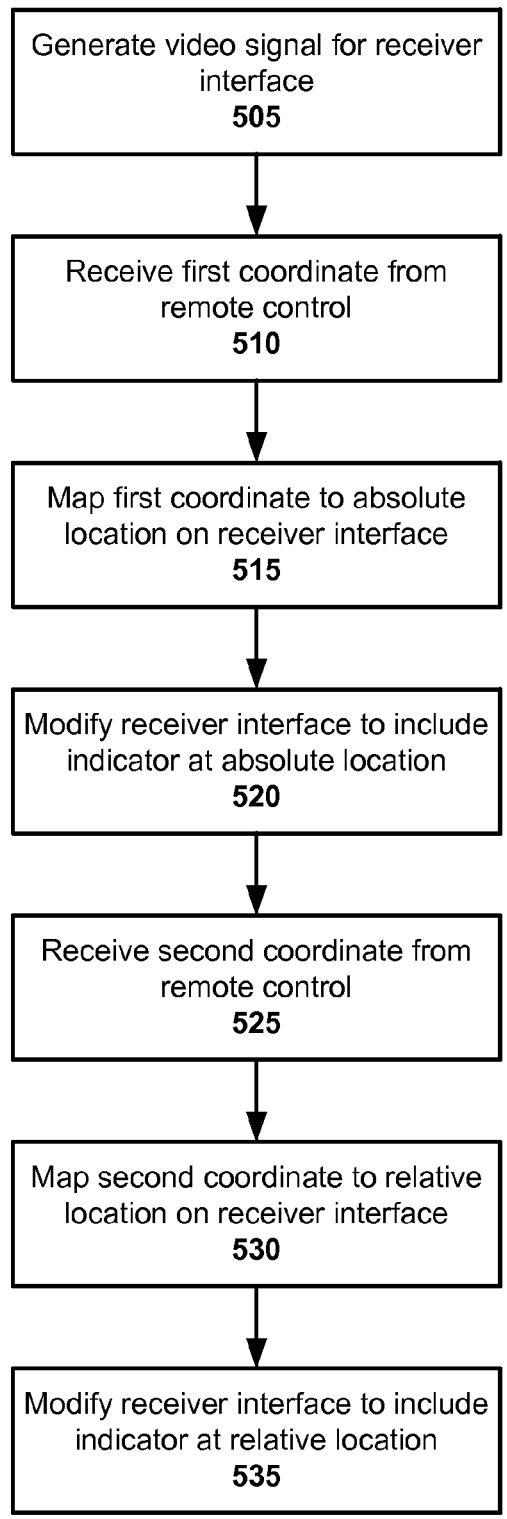
FIG. 5 shows an overview of an exemplary method according to some embodiments.

FIG. 5 provides an overview of an exemplary method embodiment 500 for implementation of combined absolute and relative position sensitive navigation of a receiver interface. Initially, at 505, a video signal for a receiver interface is generated. At 510, a first coordinate is received from a remote control, such as a first coordinate in a stream of coordinates. At 515, the first coordinate is mapped to an absolute location on the receiver interface, such as an absolute location corresponding to the position of the first coordinate on a touch sensitive interface of the remote control. At 520, the receiver interface is modified to include an indicator, such as a highlight or other indicator, at the absolute location on the receiver interface. At 525, a second coordinate is received from the remote control, such as a second coordinate in the stream of coordinates. At 530, the second coordinate is converted to a relative location on the receiver interface, such as a location that is positioned a corresponding direction and distance from the absolute location as the direction and distance of the second coordinate from the first coordinate. At 535, the receiver interface is modified to include the indicator at the relative location.

The skilled artisan will appreciate that any of a variety of conventional techniques for encoding and generation of a digital or analog video signal corresponding to the receiver can be used for the creation and modification of the receiver interface signal. As will be understood by the skilled artisan, modification of a receiver interface can be achieved using known techniques in the art of computer graphics, including modification of a data set corresponding to the distribution, colors, locations, etc., of pixels, sprites, vectors, etc.

Mapping coordinates to locations on a receiver interface can also be achieved using a variety of techniques. In one embodiment, a full range of coordinates corresponding to the remote control position sensitive interface is known. This range may be converted, for example, to a location range using one or more scaling techniques, which may convert a coordinate range to a pixel range, for example.

Such a pixel range may correspond to the full area of the receiver interface or the pixel range may correspond to a subset of the receiver interface, for example. Using scaling/conversion techniques, the absolute location on a receiver interface that a coordinate may be mapped to may be determined by applying a scaling factor to the coordinate. For determination of a relative location, a difference between coordinates may be determined and the scaling factor may be applied to the difference to determine the relative location based on a previous location. Other examples and techniques are possible.

Figure 6A:
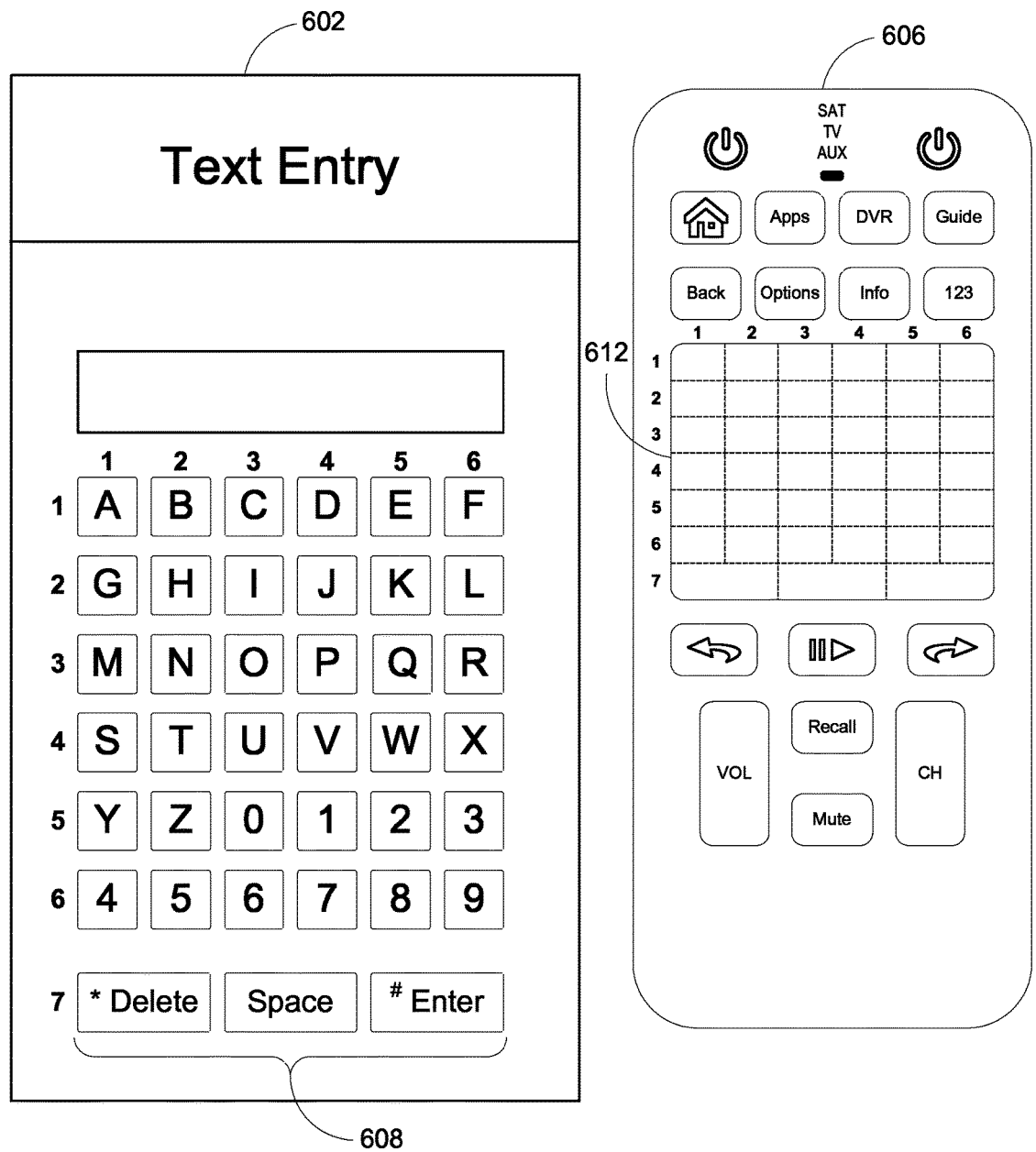
FIG. 6A, FIG. 6B, and FIG. 6C show example remote control configurations in accordance with some embodiments.
Figure 6B:
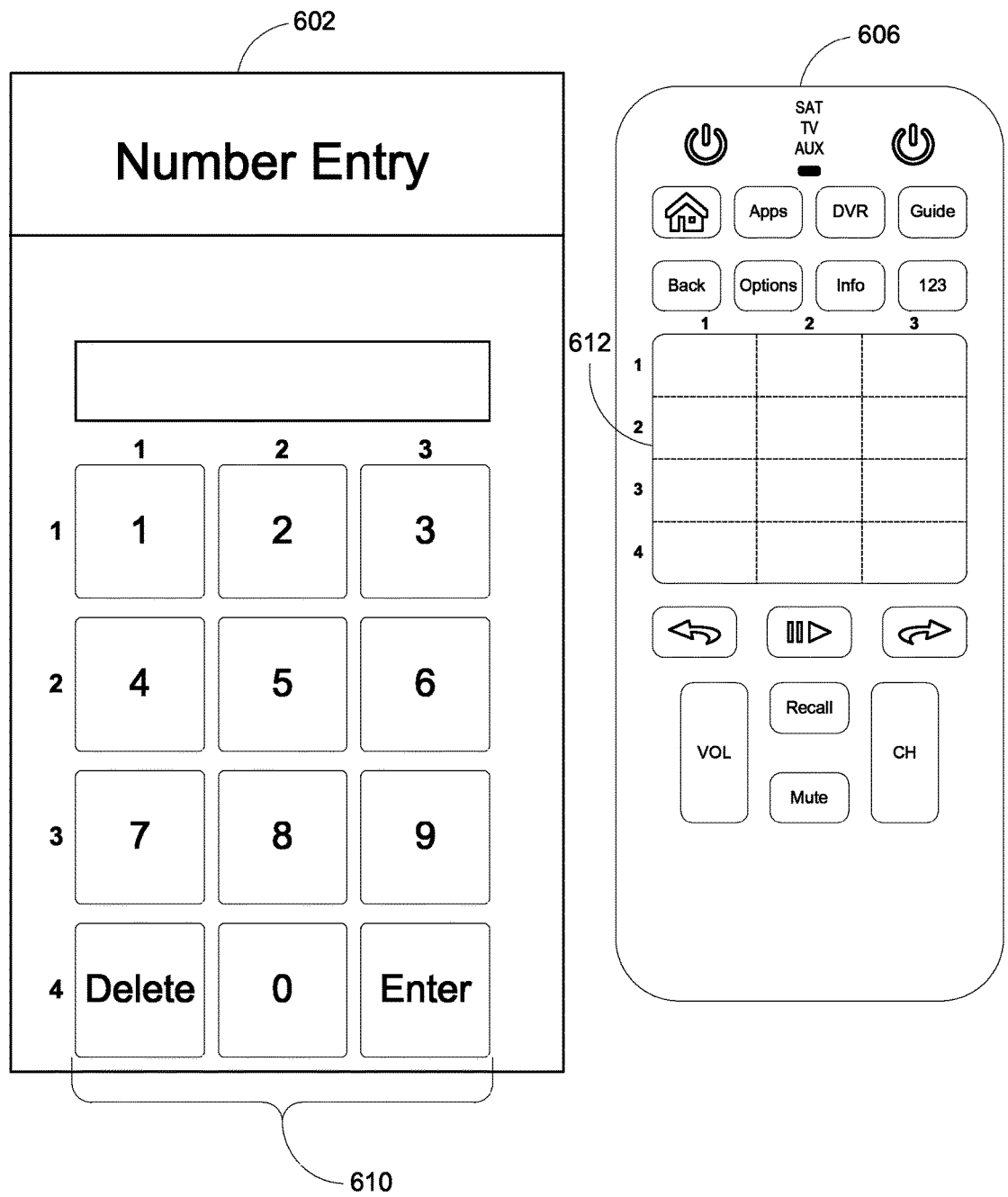
Figure 6C:
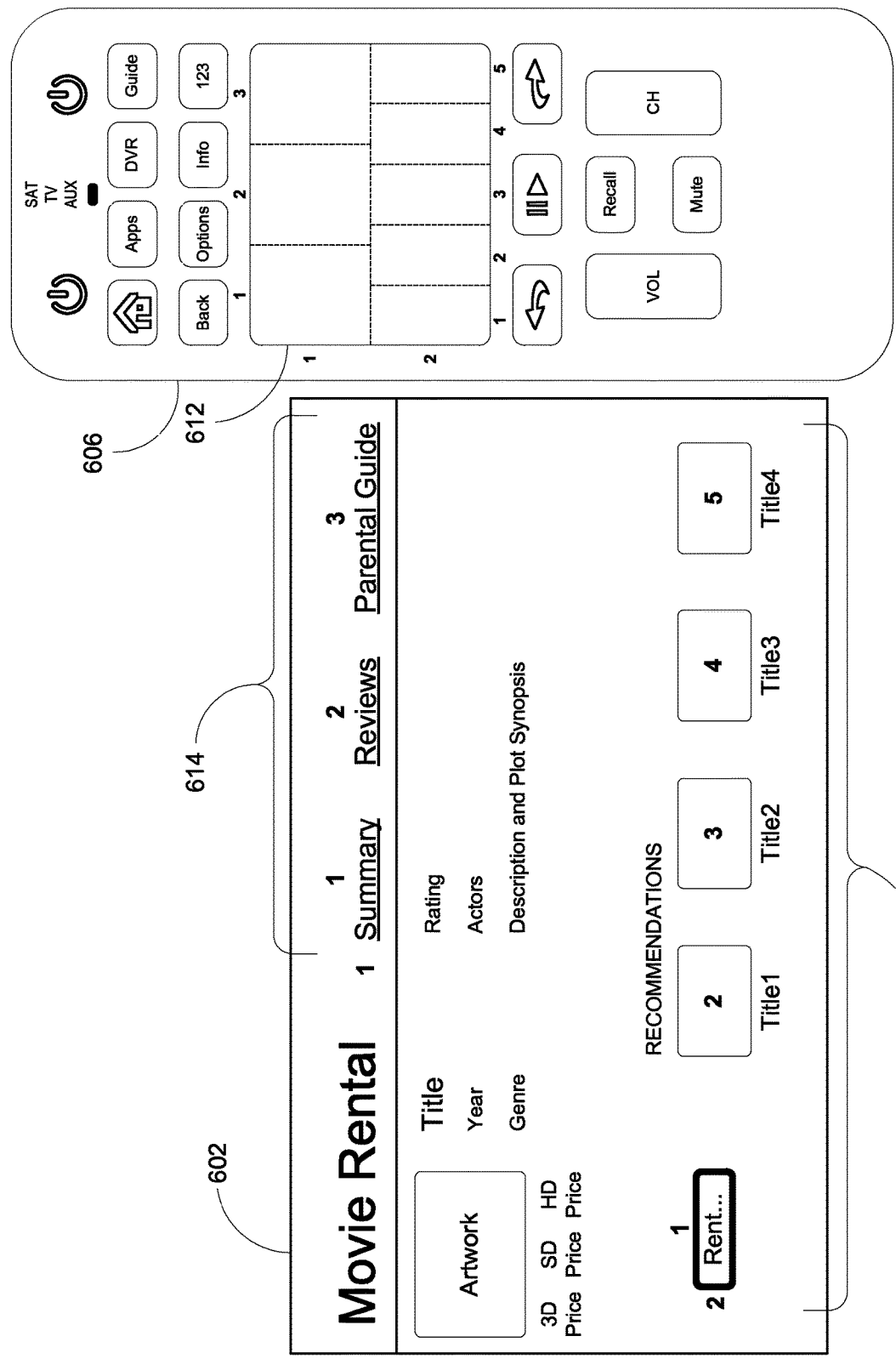

FIG. 6A, FIG. 6B, and FIG. 6C depicts embodiments showing a receiver interface 602 for entry of data and a remote control 606. For entry of data, remote control 606 includes a position sensitive interface 612. As a user's finger is placed into contact with position sensitive interface 612, coordinate data is transmitted from the remote control to a television receiver. Upon receiving the coordinate data, television receiver may modify receiver interface 602, such as by inclusion of an indicator, to represent a location corresponding to coordinates of the position sensitive interface.

In FIG. 6A, receiver interface 602 shows a first grid arrangement 608, representing a virtual keyboard for entry of text into a search box. Grid arrangement 608 shown in FIG. 6A includes seven rows with rows 1-6 including 6 columns and row 7 including 3 columns. Coordinates received from remote control 606 need not be so distributed, but may be simply be transmitted as coordinates independent of what is depicted on receiver interface 602. Upon receiving coordinates from remote control 606, these coordinates can be interpreted by a television receiver as mapped onto the grid arrangement 608. In one embodiment, coordinates received at the television receiver can be scaled to match corresponding locations on the receiver interface. For example, coordinates which are generated upon a user's finger being placed into contact with the position sensitive interface 612 at row 4 column 3 (4, 3), are mapped onto the receiver interface location for the character "U". Similarly, coordinates which are generated upon a user's finger being placed into contact with the position sensitive interface 612 at row 7 column 1 (7, 1) or column 2 (7, 2), are mapped onto the receiver interface location for "* Delete". Absolute mapping or relative navigation, as described above, may be implemented in such interpretation and mapping of coordinates received to locations on the receiver interface 602.

In FIG. 6B, the receiver interface advances to another grid arrangement 610, which is different from the grid arrangement 608, representing a numeral keypad for entry of numerals. Grid arrangement 610 includes four rows and three columns. Upon receiving coordinates from remote control 606, these coordinates can be mapped by a television receiver onto the grid arrangement 610. In one embodiment, coordinates received at the television receiver can be scaled to match corresponding locations on the receiver interface. For example, coordinates which are generated upon a user's finger being placed into contact with the position sensitive interface 612 at row 3 column 1 (3, 1), are mapped onto the receiver interface location for the number "7". Similarly, coordinates which are generated upon a user's finger being placed into contact with the position sensitive interface 612 at row 1 column 3 (1, 3) are mapped onto the receiver interface location for the number "3". Absolute mapping or relative navigation, as described above, may be implemented in such interpretation and mapping of coordinates received to locations on the receiver interface 602.

Although the grid arrangements 608 and 610 shown on receiver interface 602 are generally of an array nature, this is not a requirement. Any grid arrangement is possible, and coordinates received from remote control 606 can be mapped onto whatever grid arrangement is presented on receiver interface 602 in a dynamic way, allowing for seamless and intuitive use of remote control 606 by a user.

FIG. 6C shows receiver interface modified to show another grid arrangement 614, which is different from the grid arrangements 608 and 610, representing items on a video on-demand/movie rental screen. Grid arrangement 614 includes two rows. Row 1 of grid arrangement 614 includes 3 columns representing 3 items. Row 2 of grid arrangement 614 includes 5 columns representing 5 items. Upon receiving coordinates from remote control 606, these coordinates can be mapped by a television receiver onto the grid arrangement 614. For example, coordinates which are generated upon a user's finger being placed into contact with the position sensitive interface 612 at row 1 column 2 (1, 2), are mapped onto the receiver interface location for the item "Reviews". Similarly, coordinates which are generated upon a user's finger being placed into contact with the position sensitive interface 612 at row 2 column 5 (2, 5) are mapped onto the receiver interface location for item "Title4". Absolute mapping or relative navigation, as described above, may be implemented in such interpretation and mapping of coordinates received to locations on the receiver interface 602.

Figure 7:
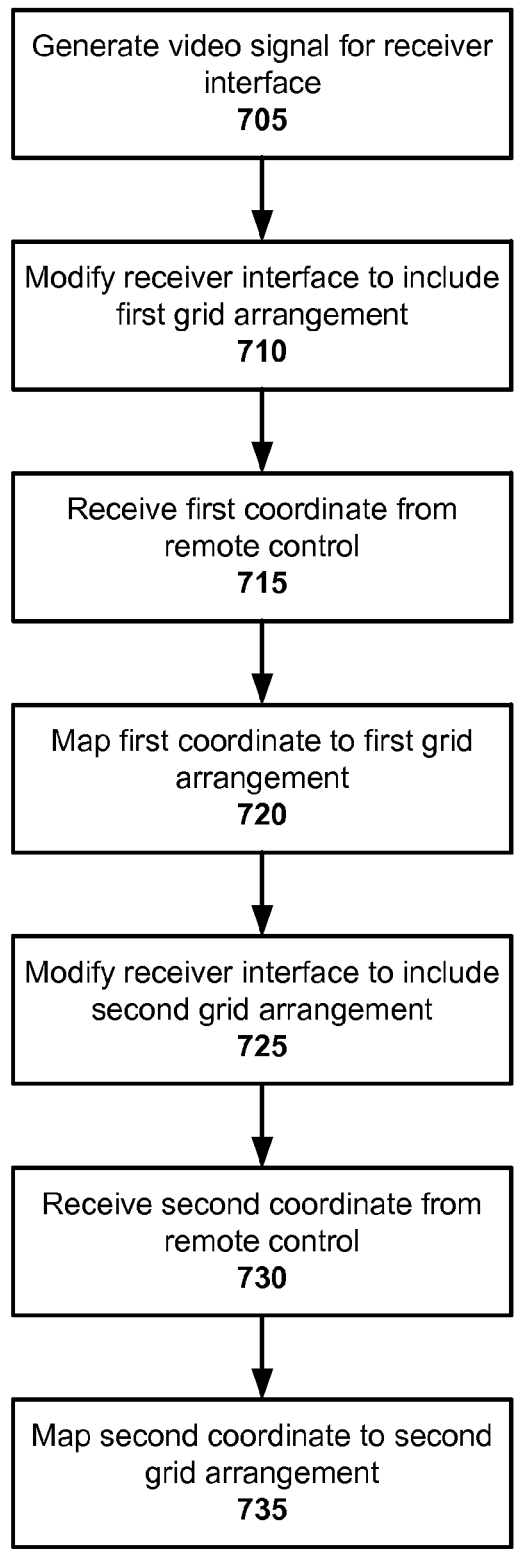
FIG. 7 shows an overview of an exemplary method according to some embodiments.

FIG. 7 provides an overview of an exemplary method embodiment 700 for implementation of dynamic scaling of a remote control position sensitive interface to a graphical user interface grid. Initially, at 705, a video signal for a receiver interface is generated. At 710, the receiver interface is modified to include a first grid arrangement. At 715, a first coordinate is received from a remote control, such as a first coordinate in a stream of coordinates. At 720, the first coordinate is mapped to the first grid arrangement, such as by scaling a coordinate range of a position sensitive interface of the remote control to match at least a portion of the first grid arrangement. At 725, the receiver interface is modified to include a second grid arrangement different from the first grid arrangement. At 730, a second coordinate is received from the remote control. At 735, the second coordinate is mapped to the second grid arrangement, such as by scaling a coordinate range of a position sensitive interface of the remote control to match at least a portion of the second grid arrangement.

Figure 8:
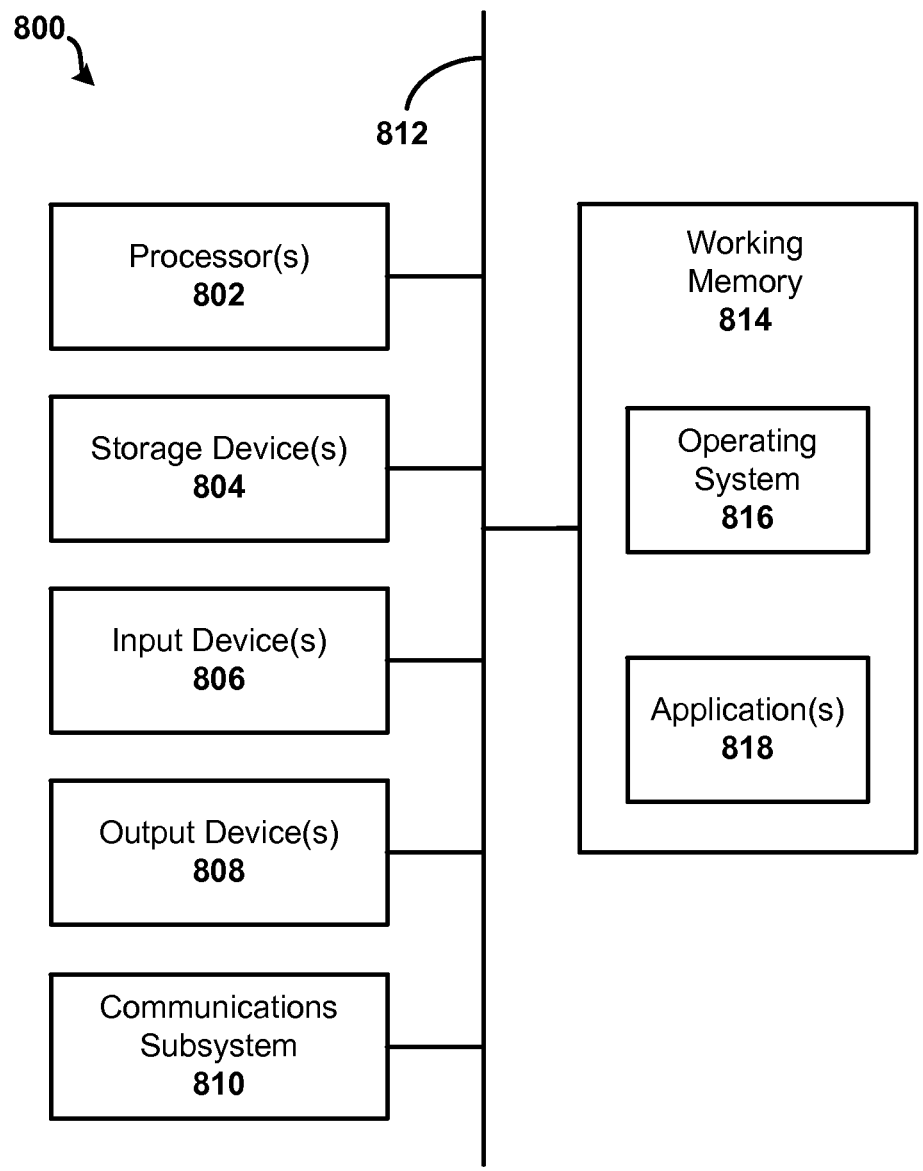
FIG. 8 shows an example computing system or device.

FIG. 8 shows an example of a computing system or device 800. The computer system 800 may be incorporated as part of one or more of the elements of the media content distribution system of FIG. 1. For example, in one embodiment, computer system 800 may represent specialized hardware for receiving and decoding television or digital media signals, such as a television receiver. The computer device 800 may perform one or more steps, operations, modules, etc., of the methods of FIGS. 5 and 7. FIG. 8 is intended to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 812 (or may otherwise be in communication, as appropriate). The hardware elements may include one or more processors 802, including without limitation one or more general-purpose processors and/or one or more special-purpose processors (such as digital signal processing chips, graphics acceleration processors, and/or the like); one or more input devices 806, which can include without limitation a mouse, a keyboard, sensors, and/or the like; and one or more output devices 808, which may include without limitation a display device, a printer, and/or the like.

The computer device 800 may further include (and/or be in communication with) one or more non-transitory storage devices 804, which may comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 optionally also includes a communications subsystem 810, which can include without limitation a modem, a network card (wireless or wired), an infrared communication device, a wireless communication device, and/or a chipset (such as a Bluetooth device, an 802.11 device, a WiFi device, a WiMax device, cellular communication facilities, etc.), and/or the like. The communications subsystem 810 may permit data to be exchanged with a network (such as the network described below, to name one example), other computer systems, and/or any other devices described herein. In many embodiments, the computer device 800 will further comprise a working memory 814, which can include a RAM or ROM device, as described above.

The computer system 800 may also comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 804 described above. In some cases, the storage medium might be incorporated within a computer system, such as computer device 800. In other embodiments, the storage medium might be separate from a computer system (e.g., a removable medium, such as a compact disc), and/or provided in an installation package, such that the storage medium may be used to program, configure, and/or adapt a general purpose computer with the instructions/code stored thereon. These instructions optionally take the form of executable code, which is executable by the computer system 800 and/or optionally take the form of source and/or installable code, which, upon compilation and/or installation on the computer device 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, the computer system 800 may perform methods in accordance with various embodiments of the disclosure. For example, some or all of the procedures of such methods are performed by the computer device 800 in response to processor 802 executing one or more sequences of one or more instructions (which might be incorporated into the operating system 816 and/or other code, such as an application program 818) contained in the working memory 814. Such instructions may be read into the working memory 814 from another computer-readable medium, such as one or more of the non-transitory storage device(s) 804. Merely by way of example, execution of the sequences of instructions contained in the working memory 814 might cause the processor(s) 802 to perform one or more procedures of the methods described herein.

The terms "machine-readable medium" and "computer-readable medium," as used herein, refer to any non-transitory medium that participates in providing data that causes a machine to operate in a specific fashion and/or to perform specific operations. In some embodiments implemented using the computer system 800, various computer-readable media might be involved in providing instructions/code to processor(s) 802 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 804. Volatile media include, without limitation, dynamic memory, such as the working memory 814.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 802 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer device 800.

The communications subsystem 810 (and/or components thereof) generally may receive signals, and the bus 812 then might carry the signals (and/or the data, instructions, etc. carried by the signals) to the working memory 814, from which the processor(s) 802 retrieves and executes the instructions. The instructions received by the working memory 814 may optionally be stored on a non-transitory storage device 804 either before or after execution by the processor(s) 802.

It should further be understood that the components of computer system 800 may be distributed across a network. For example, some processing may be performed in one location using a first processor while other processing may be performed by another processor remote from the first processor. Other components of computer device 800 may be similarly distributed.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A television receiver comprising:
one or more processors;
a remote control interface communicatively coupled with the one or more processors;
an audio-video output connection communicatively coupled with the one or more processors; and
a non-transitory computer readable storage medium communicatively coupled with and readable by the one or more processors and having stored therein processor-readable instructions that, when executed by the one or more processors, cause the one or more processors to dynamically control a sequence different grid arrangements on a receiver interface by performing operations including:
generating a video signal for displaying a receiver interface using the audio-video output connection;
generating a first grid arrangement, wherein a grid arrangement includes a plurality of grid locations each representing different selectable actions for modifying the receiver interface;
modifying the receiver interface to include a first plurality of interactive elements;
associating the first plurality of interactive elements with selectable actions corresponding to grid locations of the first grid arrangement;
receiving first data at the remote control interface from a remote control associated with the television receiver, wherein the first data includes a first coordinate, and wherein the first coordinate corresponds to a determination of a first position of a position sensitive interface of the remote control;
mapping the first coordinate to a first grid location of the first grid arrangement, wherein mapping the first coordinate includes scaling a full coordinate range of the position sensitive interface to match a first full grid location range of the first grid arrangement by applying a first scaling factor to the first coordinate to convert the first coordinate to the first grid location;
modifying the receiver interface to include a first indicator on a first interactive element associated with the first grid location;
receiving a first selection signal from the remote control using the remote control interface, wherein the first selection signal corresponds to selection of the first interactive element;
modifying the receiver interface by performing a first selectable action associated with the first interactive element;
generating a second grid arrangement that is different from the first grid arrangement;
modifying the receiver interface to include a second plurality of interactive elements;
associating the second plurality of interactive elements with selectable actions corresponding to grid locations of the second grid arrangement;
receiving second data at the remote control interface from the remote control, wherein the second data includes a second coordinate, and wherein the second coordinate corresponds to a determination of a second position of the position sensitive interface of the remote control;
mapping the second coordinate to a second grid location of the second grid arrangement, wherein mapping the second coordinate includes scaling the full coordinate range of the position sensitive interface to match a second full grid location range of the second grid arrangement by applying a second scaling factor to the second coordinate to convert the second coordinate to the second grid location;
modifying the receiver interface to include a second indicator on a second interactive element associated with the second grid location;

receiving a second selection signal from the remote control using the remote control interface, wherein the second selection signal corresponds to selection of the second interactive element; and modifying the receiver interface by performing a second selectable action associated with the second interactive element.

2. The television receiver of claim 1, wherein the first grid arrangement or the second grid arrangement correspond to a virtual keyboard or a virtual number pad.

3. The television receiver of claim 1, wherein the first grid arrangement or the second grid arrangement corresponds to a hierarchical menu.

4. The television receiver of claim 1, wherein the first grid arrangement and the second grid arrangement include different numbers of grid locations.

5. The television receiver of claim 1, wherein the first grid arrangement and the second grid arrangement include a same number of grid locations, and wherein the first grid arrangement has a different layout from the second grid arrangement.

6. The television receiver of claim 1, wherein the selectable actions associated with the first grid arrangement or the second grid arrangement correspond to a command to add a character to a text box included on the receiver interface.

7. The television receiver of claim 1, wherein the selectable actions associated with the first grid arrangement or the second grid arrangement correspond to a command to navigate a hierarchical menu.

8. The television receiver of claim 1, wherein the first indicator or the second indicator correspond to a highlight included on the receiver interface.

9. The television receiver of claim 1, wherein the position sensitive interface of the remote control is a touch pad interface.

10. A computer implemented method for dynamically controlling a sequence different grid arrangements on a receiver interface, comprising:

generating, using a television receiver including one or more processors, a video signal for displaying a receiver interface;

generating a first grid arrangement, wherein a grid arrangement includes a plurality of grid locations each representing different selectable actions for modifying the receiver interface;

modifying the receiver interface to include a first plurality of interactive elements;

associating the first plurality of interactive elements with selectable actions corresponding to grid locations of the first grid arrangement;

receiving first data from a remote control associated with the television receiver, wherein the first data includes a first coordinate, and wherein the first coordinate corresponds to a determination of a first position of a position sensitive interface of the remote control;

mapping the first coordinate to a first grid location of the first grid arrangement, wherein mapping the first coordinate includes scaling a full coordinate range of the position sensitive interface to match a first full grid location range of the first grid arrangement by applying a first scaling factor to the first coordinate to convert the first coordinate to the first grid location;

modifying the receiver interface to include a first indicator on a first interactive element associated with the first grid location;

receiving a first selection signal from the remote control, wherein the first selection signal corresponds to selection of the first interactive element;

modifying the receiver interface by performing a first selectable action associated with the first interactive element;

generating a second grid arrangement that is different from the first grid arrangement;

modifying the receiver interface to include a second plurality of interactive elements;

associating the second plurality of interactive elements with selectable actions corresponding to grid locations of the second grid arrangement;

receiving second data from the remote control, wherein the second data includes a second coordinate, and wherein the second coordinate corresponds to a determination of a second position of the position sensitive interface of the remote control;

mapping the second coordinate to a second grid location of the second grid arrangement, wherein mapping the second coordinate includes scaling the full coordinate range of the position sensitive interface to match a second full grid location range of the second grid arrangement by applying a second scaling factor to the second coordinate to convert the second coordinate to the second grid location;

modifying the receiver interface to include a second indicator on a second interactive element associated with the second grid location;

receiving a second selection signal from the remote control, wherein the second selection signal corresponds to selection of the second interactive element; and modifying the receiver interface by performing a second selectable action associated with the second interactive element.

11. The method of claim 10, wherein the first grid arrangement or the second grid arrangement corresponds to a virtual keyboard or a virtual number pad.

12. The method of claim 10, wherein the first grid arrangement or the second grid arrangement corresponds to a hierarchical menu.

13. The method of claim 10, wherein the first grid arrangement and the second grid arrangement include different numbers of grid locations.

14. The method of claim 10, wherein the first grid arrangement and the second grid arrangement include a same number of grid locations, and wherein the first grid arrangement has a different layout from the second grid arrangement.

15. The method of claim 10, wherein the selectable actions associated with the first grid arrangement or the second grid arrangement correspond to a command to add a character to a text box included on the receiver interface.

16. The method of claim 10, wherein the selectable actions associated with the first grid arrangement or the second grid arrangement correspond to a command to navigate a hierarchical menu.

17. The method of claim 10, wherein the first indicator or the second indicator correspond to a highlight included on the receiver interface.

18. The method of claim 10, wherein the position sensitive interface of the remote control is a touch pad interface.

19. A non-transitory processor-readable medium comprising instructions that, when executed by one or more processors, cause the one or more processors to dynamically control a sequence different grid arrangements on a receiver interface by performing operations including:
  generating a video signal for displaying a receiver interface using an audio-video output connection of a television receiver;
  generating a first grid arrangement, wherein a grid arrangement includes a plurality of grid locations each representing different selectable actions for modifying the receiver interface;
  modifying the receiver interface to include a first plurality of interactive elements;
  associating the first plurality of interactive elements with selectable actions corresponding to grid locations of the first grid arrangement;
  receiving first data at a remote control interface of the television receiver from a remote control associated with the television receiver, wherein the first data includes a first coordinate, and wherein the first coordinate corresponds to a determination of a first position of a position sensitive interface of the remote control;
  mapping the first coordinate to a first grid location of the first grid arrangement, wherein mapping the first coordinate includes scaling a full coordinate range of the position sensitive interface to match a first full grid location range of the first grid arrangement by applying a first scaling factor to the first coordinate to convert the first coordinate to the first grid location;
  modifying the receiver interface to include a first indicator on a first interactive element associated with the first grid location;
  receiving a first selection signal from the remote control, wherein the first selection signal corresponds to selection of the first interactive element;
  modifying the receiver interface by performing a first selectable action associated with the first interactive element;
  generating a second grid arrangement that is different from the first grid arrangement;
  modifying the receiver interface to include a second plurality of interactive elements;
  associating the second plurality of interactive elements with selectable actions corresponding to grid locations of the second grid arrangement;
  receiving second data at the remote control interface from the remote control, wherein the second data includes a second coordinate, and wherein the second coordinate corresponds to a determination of a second position of the position sensitive interface of the remote control;
  mapping the second coordinate to a second grid location of the second grid arrangement, wherein mapping the second coordinate includes scaling the full coordinate range of the position sensitive interface to match a second full grid location range of the second grid arrangement by applying a second scaling factor to the second coordinate to convert the second coordinate to the second grid location;
  modifying the receiver interface to include a second indicator on a second interactive element associated with the second grid location;
  receiving a second selection signal from the remote control, wherein the second selection signal corresponds to selection of the second interactive element; and
  modifying the receiver interface by performing a second selectable action associated with the second interactive element.

20. The non-transitory processor-readable medium of claim 19, wherein the selectable actions associated with the first grid arrangement or the second grid arrangement correspond to a command to add a character to a text box included on the receiver interface or to navigate a hierarchical menu.

* * * * *